United States Patent
Xie et al.

(10) Patent No.: US 10,269,307 B2
(45) Date of Patent: Apr. 23, 2019

(54) LED DRIVER HEADROOM VOLTAGE CONTROL SYSTEMS AND METHODS

(71) Applicant: Apple Inc., Cupertino, CA (US)

(72) Inventors: Yanhui Xie, Santa Clara, CA (US); Asif Hussain, San Jose, CA (US); Jingdong Chen, San Jose, CA (US); Mohammad J. Navabi-Shirazi, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/683,648

(22) Filed: Aug. 22, 2017

(65) Prior Publication Data

US 2018/0336843 A1 Nov. 22, 2018

Related U.S. Application Data

(60) Provisional application No. 62/509,021, filed on May 19, 2017.

(51) Int. Cl.
*G09G 3/34* (2006.01)
*H05B 33/08* (2006.01)

(52) U.S. Cl.
CPC ........... *G09G 3/342* (2013.01); *G09G 3/3413* (2013.01); *H05B 33/0809* (2013.01); *H05B 33/0824* (2013.01); *H05B 33/0827* (2013.01); *H05B 33/0848* (2013.01); *G09G 2310/024* (2013.01); *G09G 2320/064* (2013.01); *G09G 2330/021* (2013.01); *G09G 2330/12* (2013.01)

(58) Field of Classification Search
CPC .. G09G 3/342; G09G 3/3413; H05B 33/0809; H05B 33/0824; H05B 33/0877; H05B 33/0848
See application file for complete search history.

(56) References Cited

U.S. PATENT DOCUMENTS

| | | | |
|---|---|---|---|
| 9,531,931 B2 | 12/2016 | Patel et al. | |
| 2008/0297461 A1 | 12/2008 | Hsu et al. | |
| 2009/0273288 A1* | 11/2009 | Zhao | G09G 3/342 |
| | | | 315/185 R |
| 2010/0289424 A1 | 11/2010 | Chang et al. | |
| 2016/0353541 A1 | 12/2016 | Ondrisek et al. | |
| 2016/0381748 A1 | 12/2016 | Hagino | |

FOREIGN PATENT DOCUMENTS

EP 2296136 A1 3/2011

OTHER PUBLICATIONS

International Search Report and Written Opinion from PCT/US2018/028127, dated Jul. 18, 2018, 20 pages.

* cited by examiner

*Primary Examiner* — Charles V Hicks
(74) *Attorney, Agent, or Firm* — Jaffery Watson Mendonsa & Hamilton LLP

(57) ABSTRACT

Aspects of the subject technology relate to control circuitry for operating light-emitting diodes (LEDs). The control circuitry may include a pulse-width-modulation (PWM) driver for the LEDs and headroom voltage control circuitry. The PWM driver may adjust a rising edge or a trailing edge of the PWM cycles for various LEDs to ensure a headroom voltage detection window for the headroom voltage control circuitry to sample the headroom voltage of those LEDs without being affected by the rising edge of the PWM cycle for LED or the falling edge of the PWM cycle for another LED.

21 Claims, 9 Drawing Sheets

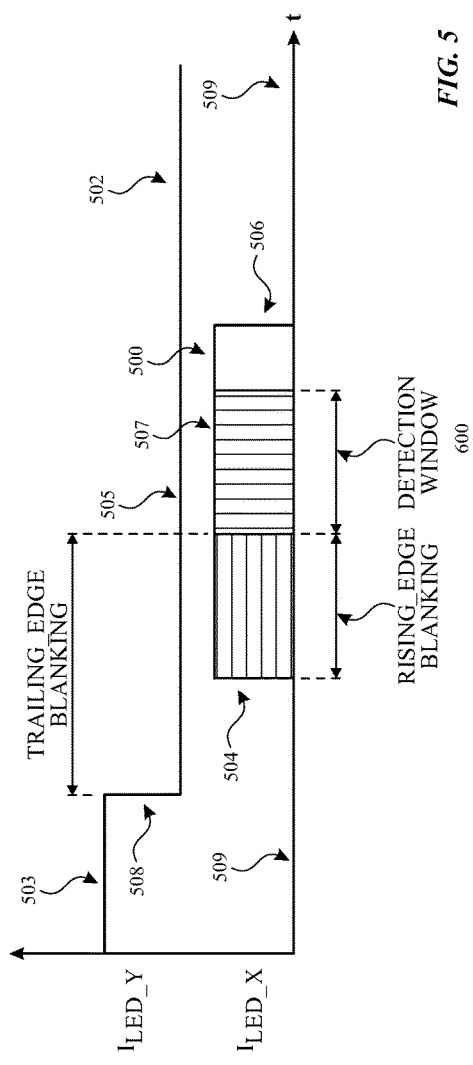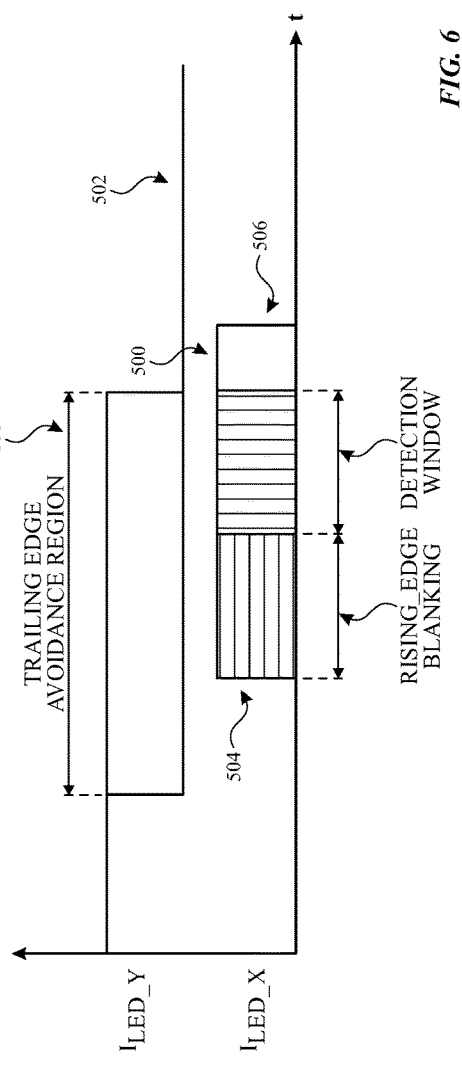

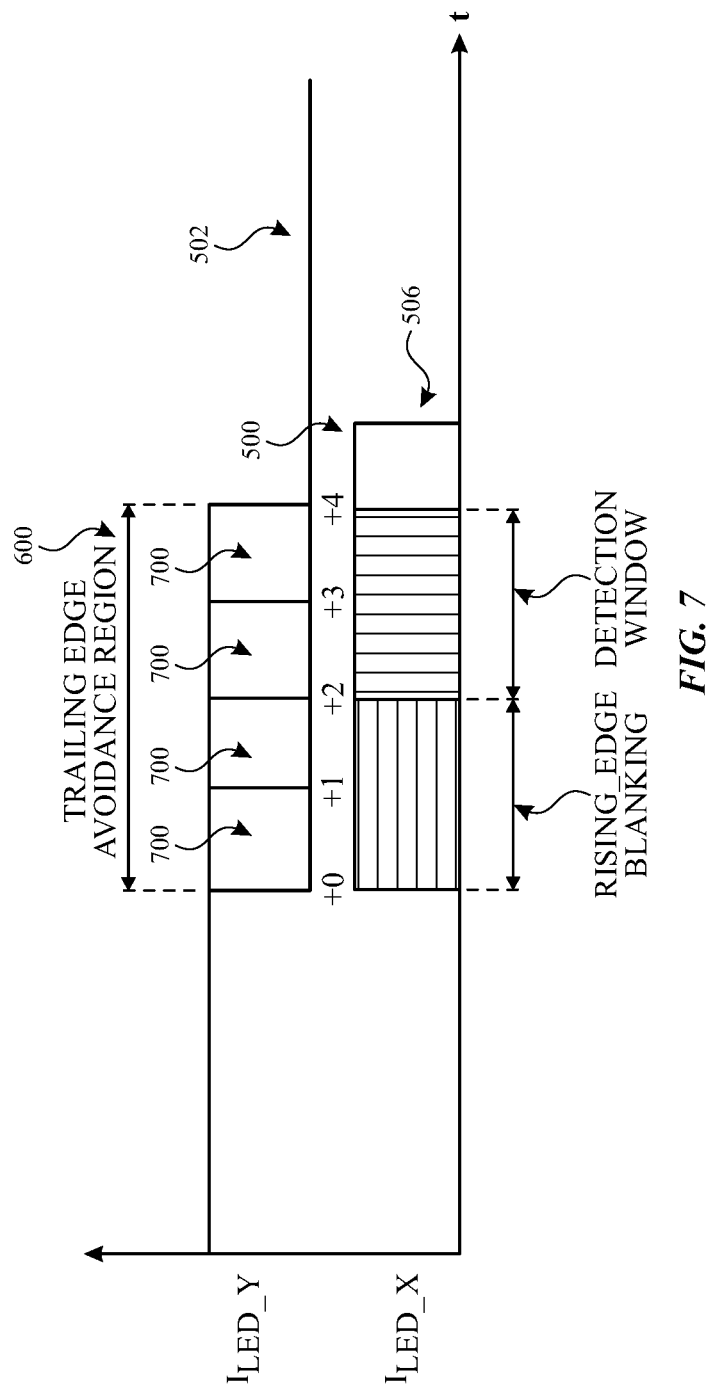

LED DRIVER HEADROOM VOLTAGE CONTROL SYSTEMS AND METHODS

CROSS-REFERENCE TO RELATED APPLICATIONS

The present application claims the benefit of U.S. Provisional Patent Application Ser. No. 62/509,021, entitled "LED Driver Headroom Voltage Control Systems and Methods," filed on May 19, 2017, which is hereby incorporated by reference in its entirety for all purposes.

TECHNICAL FIELD

The present description relates generally to electronic devices with light-emitting-diodes, and more particularly, but not exclusively, to electronic devices with light-emitting-diodes with headroom voltage control and pulse-width-modulation.

BACKGROUND

Electronic devices such as computers, media players, cellular telephones, set-top boxes, and other electronic equipment are often provided with light-emitting-diodes (LEDs) for illuminating portions of the device and/or providing visual indicators of device status.

In some devices, LEDs are included in displays such as organic light-emitting diode (OLED) displays and liquid crystal displays (LCDs) typically include an array of display pixels arranged in pixel rows and pixel columns. Liquid crystal displays commonly include a backlight unit and a liquid crystal display unit with individually controllable liquid crystal display pixels. The backlight unit commonly includes one or more light-emitting diodes (LEDs) that generate light that exits the backlight toward the liquid crystal display unit. The liquid crystal display pixels are individually operable to control passage of light from the backlight unit through that pixel to display content such as text, images, video, or other content on the display.

BRIEF DESCRIPTION OF THE DRAWINGS

Certain features of the subject technology are set forth in the appended claims. However, for purpose of explanation, several embodiments of the subject technology are set forth in the following figures.

FIG. 5 illustrates an exemplary timing diagram for operation of, and headroom detection for LEDs in accordance with various aspects of the subject technology.

FIG. 6 illustrates an exemplary timing diagram including a trailing-edge-avoidance region for operation of, and headroom detection for LEDs in accordance with various aspects of the subject technology.

FIG. 7 illustrates an exemplary timing diagram including clock cycle adjustments for a trailing edge of a pulse-width-modulation cycle for operation of, and headroom detection for LEDs in accordance with various aspects of the subject technology.

DETAILED DESCRIPTION

Figure 1:
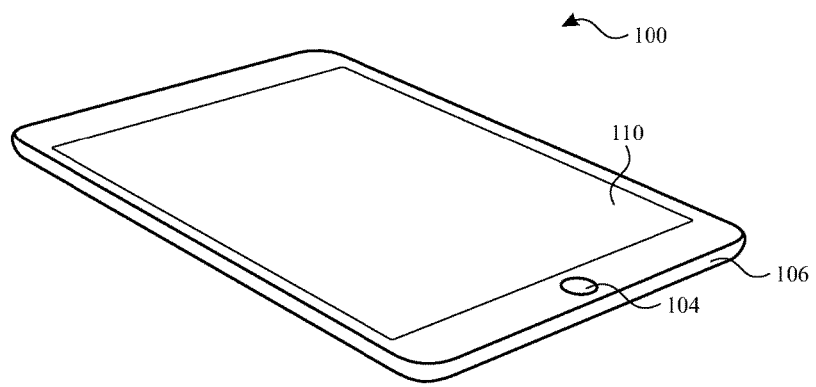
FIG. 1 illustrates a perspective view of an example electronic device in accordance with various aspects of the subject technology.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

The subject disclosure provides control circuitry for light-emitting diodes (LEDs). The control circuitry includes headroom voltage control circuitry that ensures that sufficient voltage is supplied to all LEDs while minimizing residual or headroom voltage to avoid unwanted dissipation of power.

LEDs may be provided in electronic devices such as cellular telephones, media players, computers, laptops, tablets, set-top boxes, wireless access points, and other electronic equipment. For example, electronic devices may include LEDs in displays that may be used to present visual information and status data and/or may be used to gather user input data, keyboards, flash LEDs, and/or other components. The brightness of the LEDs may be controlled by a pulse-width-modulation (PWM) signal.

Various examples are described herein in the context of LEDs and associated LED control circuitry implemented in display backlights. However, it should be appreciated that these examples are merely illustrative and the disclosed LED control systems and methods described herein may be implemented in other contexts in which PWM and headroom control of LEDs is desired (e.g., for illumination of keyboards, flash components, etc.).

LED control circuitry such as backlight control circuitry includes circuitry for operating one or more strings of LEDs using pulse-width modulation (PWM) to control the brightness of the LEDs. Each string may include one or more LEDs coupled in series between a supply voltage source and a current controller. The supply voltage source may provide a common supply voltage to the LED strings. The LED control circuitry also includes headroom voltage control circuitry that samples a headroom voltage for each string of LEDs and raises or lowers the supply voltage to maintain a desired headroom voltage.

As described in further detail hereinafter, the headroom voltage control circuitry samples the headroom voltage for each string of LEDs during a PWM-on pulse of a PWM signal for that string. In order to prevent a rising edge of the PWM-on pulse of that string, or the falling or trailing edge of the PWM-on pulse of one or more other strings from affecting the sampled voltage, the LED control circuitry may modify the rising and/or trailing edges of the PWM-on pulses of the other strings to prevent any trailing edges of any other strings from occurring during a trailing-edge avoidance region of time around the detection window for each string.

Further details of the determination of the trailing-edge avoidance region and the modifications to the rising and/or trailing edges are described hereinafter.

An illustrative electronic device of the type that may be provided with one or more LEDs, and associated LED control circuitry, (e.g., in a display) is shown in FIG. 1. In the example of FIG. 1, device 100 has been implemented using a housing that is sufficiently small to be portable and carried by a user (e.g., device 100 of FIG. 1 may be a handheld electronic device such as a tablet computer or a cellular telephone). As shown in FIG. 1, device 100 may include a display such as display 110 mounted on the front of housing 106. Display 110 may be substantially filled with active display pixels or may have an active portion and an inactive portion. Display 110 may have openings (e.g., openings in the inactive or active portions of display 110) such as an opening to accommodate button 104 and/or other openings such as an opening to accommodate a speaker, a light source, or a camera.

Display 110 may be a touch screen that incorporates capacitive touch electrodes or other touch sensor components or may be a display that is not touch-sensitive. Display 110 may include display pixels formed from light-emitting diodes (LEDs), organic light-emitting diodes (OLEDs), plasma cells, electrophoretic display elements, electrowetting display elements, liquid crystal display (LCD) components, or other suitable display pixel structures. Arrangements in which display 110 is formed using LCD pixels and LED backlights are sometimes described herein as an example. This is, however, merely illustrative. In various implementations, any suitable type of display technology may be used in forming display 110 if desired.

Housing 106, which may sometimes be referred to as a case, may be formed of plastic, glass, ceramics, fiber composites, metal (e.g., stainless steel, aluminum, etc.), other suitable materials, or a combination of any two or more of these materials.

The configuration of electronic device 100 of FIG. 1 is merely illustrative. In other implementations, electronic device 100 may be a computer such as a computer that is integrated into a display such as a computer monitor, a laptop computer, a somewhat smaller portable device such as a wrist-watch device, a pendant device, or other wearable or miniature device, a media player, a gaming device, a navigation device, a computer monitor, a television, or other electronic equipment.

For example, in some implementations, housing 106 may be formed using a unibody configuration in which some or all of housing 106 is machined or molded as a single structure or may be formed using multiple structures (e.g., an internal frame structure, one or more structures that form exterior housing surfaces, etc.). Although housing 106 of FIG. 1 is shown as a single structure, housing 106 may have multiple parts. For example, housing 106 may have upper portion and lower portion coupled to the upper portion using a hinge that allows the upper portion to rotate about a rotational axis relative to the lower portion. A keyboard such as a QWERTY keyboard and a touch pad may be mounted in the lower housing portion, in some implementations.

In some implementations, electronic device 100 may be provided in the form of a computer integrated into a computer monitor. Display 110 may be mounted on a front surface of housing 106 and a stand may be provided to support housing (e.g., on a desktop).

Figure 2:
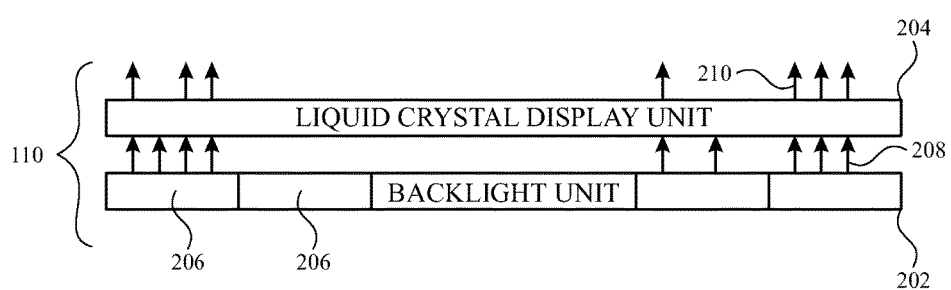
FIG. 2 illustrates a block diagram of a side view of an exemplary electronic device display having a backlight unit in accordance with various aspects of the subject technology.

FIG. 2 is a schematic diagram of display 110 showing how the display may be provided with a liquid crystal display unit 204 and a backlight unit 202. As shown in FIG. 2, backlight unit 202 generates backlight 208 and emits backlight 208 in the direction of liquid crystal display unit 204. Liquid crystal display unit 204 selectively allows some or all of the backlight 208 to pass through the liquid crystal display pixels therein to generate display light 210 visible to a user. Backlight unit may include one or more subsections 206. In some implementations, subsections 206 may be elongated subsections that extend horizontally or vertically across some or all of display 110 (e.g., in an edge-lit configuration for backlight unit 202). In other implementations, subsections 206 may be square or nearly square subsections (e.g., in a two-dimensional array backlight configuration). Accordingly, subsections 206 may be defined one or more strings of LEDs disposed in that subsection. Subsections 206 may be controlled individually for local dimming of backlight 208.

Figure 3:
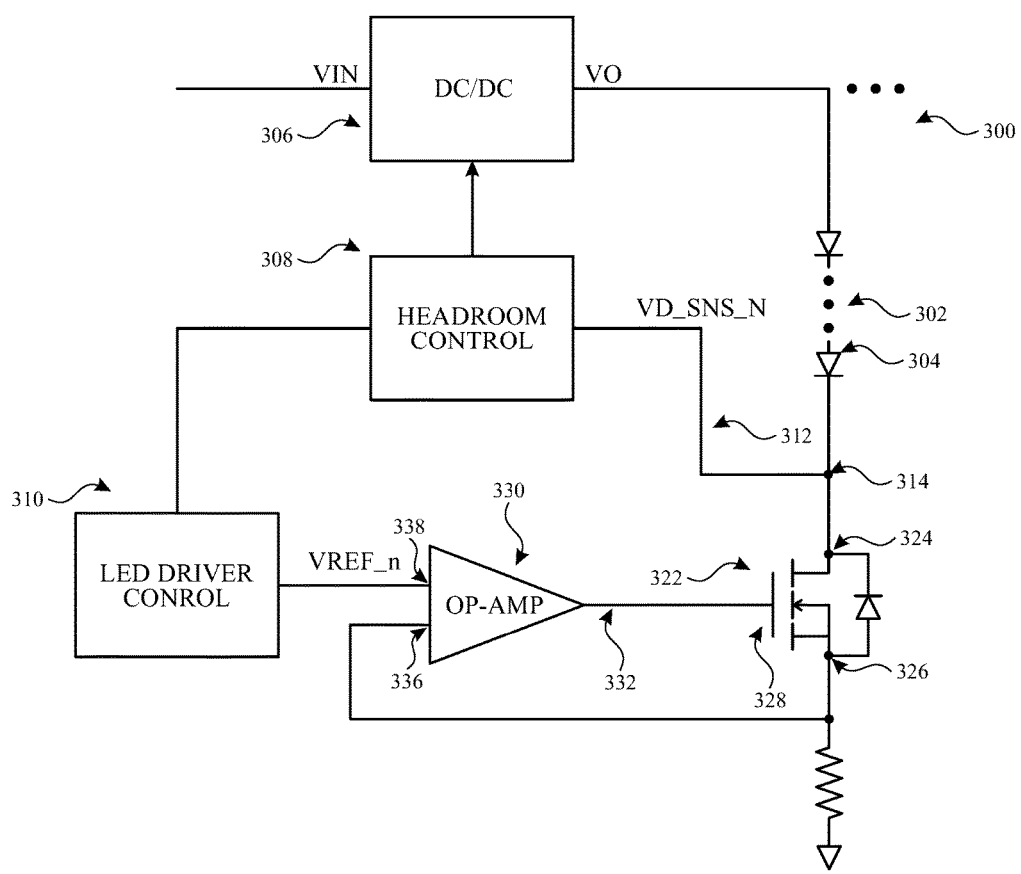
FIG. 3 illustrates a schematic view of exemplary LED control circuitry including headroom voltage control circuitry in accordance with various aspects of the subject technology.

FIG. 3 shows a schematic diagram of exemplary LED control circuitry 300 (e.g., backlight control circuitry that may be implemented in backlight unit 202). In the example of FIG. 3, circuitry 300 includes at least one string 302 of LEDs 304. Strings 302 each include one or more LEDs 304 in series. The strings 302 of LEDs 304 receive a common supply voltage Vo, at a first end of the string from a common supply voltage source such as DC/DC converter 306. Each string 302 of LEDs 304 is also coupled, at a second end of that string 302, to current control circuitry such as a current regulation transistor 322 (e.g., a field effect transistor such as a metal oxide semiconductor field effect transistors) that controls the current through LEDs 304.

In the example of FIG. 3, transistor 322 is a current regulation transistor having a first source/drain terminal 324 coupled to an end of LED string 302 that is opposite the end at which supply voltage Vo is provided to string 302. Transistor 322 also includes a gate terminal 328 coupled to an output 332 of an operational amplifier 330, and a second source/drain terminal 326 coupled to a ground voltage through a resistor. Amplifier 330 receives, at a first input 338, a reference voltage Vref_n and, at a second input 336, a feedback voltage from the second source/drain terminal 326.

The DC/DC output voltage Vo can be adaptively adjusted based on a monitoring of the headroom voltage at the end of each string. In the example of FIG. 3, the headroom voltage for string 302 is sampled by headroom control circuitry 308 at location 314 via sampling line 312. The sampled headroom voltage may be used by headroom control circuitry 308 to operate DC/DC converter 306 to provide a supply voltage Vo that ensures that the headroom voltage is within a hysteresis window. The sampled headroom voltage for a string 302 may be a residual voltage at a second end of the string that is opposite the end of the string that is coupled to supply voltage Vo (e.g., to DC/DC converter 306). It may be desirable to maintain the residual voltage for all strings at a level that ensures sufficient voltage for the operations of all LEDs in all strings but that reduces or minimizes waste due to power dissipation due to the residual voltages.

Although a single string 302 is shown in FIG. 3, it should be appreciated that multiple LED strings 302 can be coupled in parallel between the common voltage supply source 306 and current control circuitry for that string. In implementations in which multiple strings 302 receive supply voltage Vo from source 306 and provide a headroom voltage to headroom control circuit 308, the sampled headroom voltage for each string 302 may be compared to upper and lower threshold voltages. In these multiple channel implementations, if the headroom voltage for any of the LED channels is lower than the lower threshold, DC/DC output voltage Vo can be increased to provide additional headroom. If the headroom voltage of all of the LED channels is higher than the upper threshold, DC/DC voltage Vo can be decreased.

Local dimming of the LEDs in each string may be performed by controlling the current through each string 302 using a PWM signal in which the duty cycle of the PWM signal controls the brightness of the LED. For example, LED driver control circuit 310 may control the current through transistor 322, via amplifier 330, by providing a pulse-width-modulated control signal to gate terminal 328 of transistor 322. The pulse-width-modulated control signal can be provided individually for each string 302 of LEDs 304 so that local dimming of that string can be provided as desired, even with a common supply voltage Vo for multiple strings. PWM signals for some strings 302 may be phase shifted relative to the PWM signals for other strings 302. For example, a phase shift may be applied between the rising edges of the PWM-on pulses of various groups of strings 302.

Figure 4:
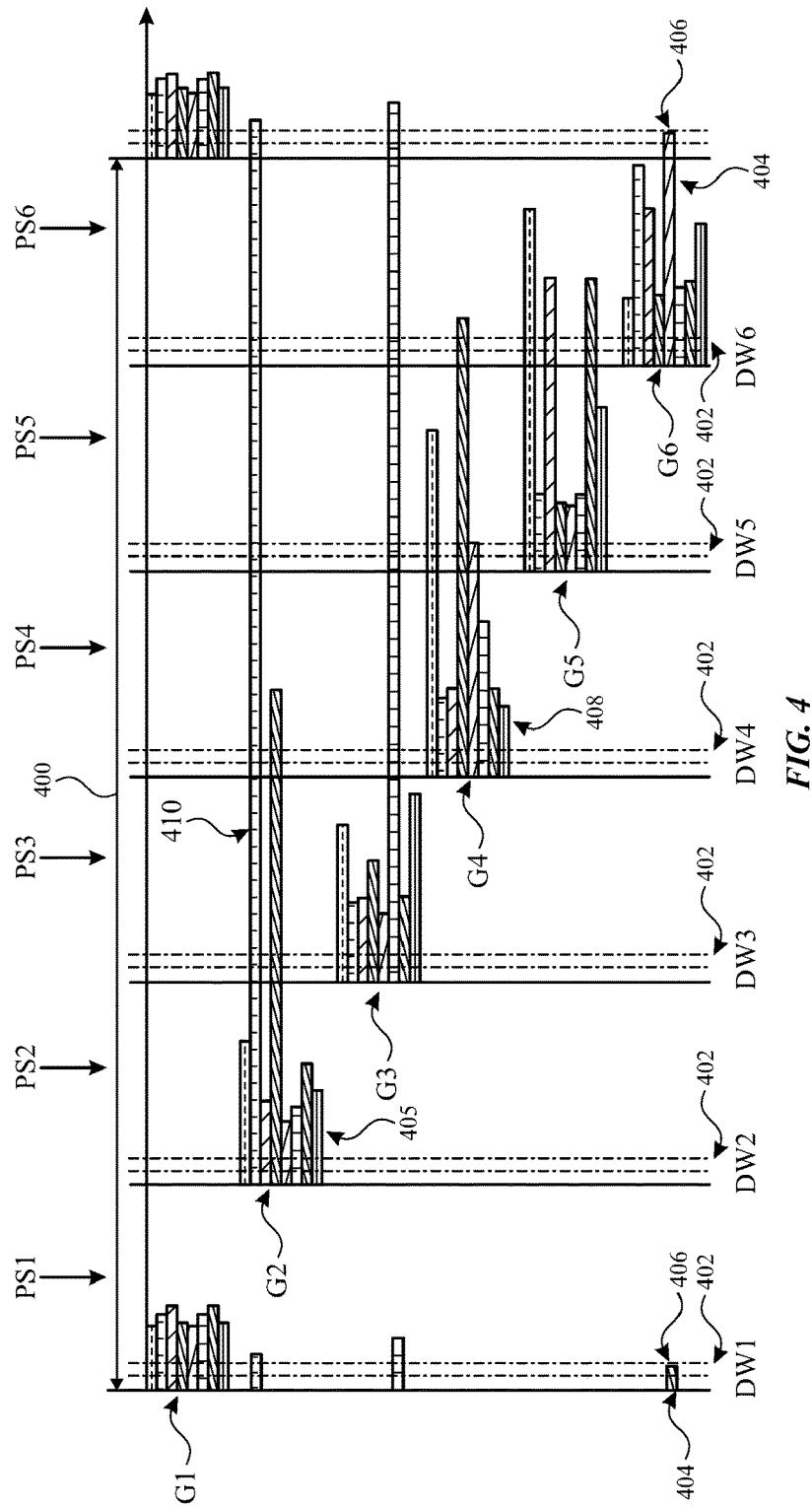
FIG. 4 illustrates a phase shift diagram for a system of multiple LEDs in accordance with various aspects of the subject technology.

FIG. 4 shows an exemplary phase shift diagram in which phase shifts are applied, within a PWM period, to various groups of LED channels (e.g., LED strings) in accordance with some aspects of the present disclosure. In the example of FIG. 4, within a PWM period 400, the duty cycles 405 of various strings of LEDs are represented as horizontal bars having a length that represents the duty cycle. As shown, the duty cycles 405 are separated into groups G1, G2, G3, G4, G5, and G6 each associated with a corresponding phase shift portion PS1, PS2, PS3, PS4, PS5, and PS6 of PWM period 400. The duty cycles 405 of the strings in group G1 begin at the beginning of period 400, and the duty cycles 405 of the strings in groups G2-G6 are phase shifted (e.g., the rising edges of the PWM-on pulses are delayed) into later phase shift portions. The duty cycles 405 represented in FIG. 4 include relatively short duty cycles 408 and relatively long duty cycles 410.

The headroom voltage for each string is sampled during an on-pulse of the PWM cycle for that string. However, the sampled headroom voltage can be inaccurate if sampled too close to the rising edge of the on-pulse of the PWM cycle for that string or too close to the trailing edge, sometimes referred to as the falling edge, of the on-pulse for another string. Accordingly, headroom voltage control circuitry 308 samples the headroom voltage for each LED during a headroom voltage detection window for that string, the headroom voltage detection window for each string occurring after a rising-edge blanking period that follows the rising edge of the PWM-on pulse for that string and after a trailing-edge-blanking window for one or more other strings. FIG. 4 indicates headroom voltage detection windows 402 (labeled DW1, DW2, DW3, DW4, DW5, and DW6) for each group of strings during which the headroom voltage for all of the strings in that group are to be sampled for headroom control operations.

However, in the example of FIG. 4, because of the varied duty cycles and the variability of the duty cycles individually, if care is not taken, the falling edge 406 of the PWM-on pulse of a particular duty cycle of a particular string of LEDs (see, e.g., duty cycle 404) may fall within the detection window 402 of another group of strings. Because the sampling of the headroom voltage for a particular string at or near the time of the falling edge of the PWM-on pulse of another string may be prevented, and because the detection window occurs after the rising edge blanking period for that string, a string with a short duty cycle 408 may be entirely blanked from headroom voltage detection if care is not taken.

In order to help ensure that a headroom voltage detection window 402 is available for each particular string and for each PWM cycle, a trailing-edge-avoidance region of time may be identified for each other string relative to the detection window for that particular string. The rising edge and/or the trailing edge of each PWM pulse of the PWM cycle for each other string may be modified to prevent the trailing edge of that other string from occurring within the trailing-edge-avoidance region.

FIG. 5 shows a trailing edge and detection window timing diagram in accordance with various aspects of the disclosure. In the example of FIG. 5, there are two LED channels X and Y corresponding to, for example first and second LED strings 302. In the example of FIG. 5, a first PWM signal 500 for a first string (e.g., string X) and a second PWM signal 502 for a second string (e.g., string Y) are shown. In particular, a portion of PWM signal 500 including the rising edge 504 and the trailing edge 506 of a PWM-on pulse 507 for the first (X) string is shown. PWM signal 500 also includes PWM-off pulses 509 that alternate with PWM-on pulses. A portion of PWM signal 502 including a trailing edge 508 of a PWM-on pulse 503 for the second (Y) string is shown. PWM signal 502 also includes a PWM-off pulse 505. FIG. 5 also shows a headroom voltage detection window for the first string that follows a rising edge blanking time for the first string. In this way, the detection window for the first string occurs at a time that prevents an inaccurate sampling of the headroom voltage for that string due to the rising edge of the PWM-on pulse for that LED.

FIG. 5 also shows a trailing-edge-blanking period associated with the trailing edge of the second (Y) string. If channel Y's trailing edge 508 occurs after the detection window for channel X, or occurs earlier than the detection window for channel X by at least the trailing-edge-blanking time, then the trailing edge may be prevented from affecting headroom voltage detect in channel X's detection window.

In order to ensure that channel Y's trailing edge occurs after the detection window for channel X, or earlier than the detection window for channel X by at least trailing-edge-blanking time, a trailing-edge-avoidance region 600 for the second (Y) string may be defined as shown in FIG. 6. The trailing edge 508 and/or the rising edge of PWM-on pulse for the second (Y) string can be adjusted based on the trailing-edge-avoidance region 600 such that channel Y's trailing edge is always beyond the detection window for channel X, or earlier than the detection window for channel X by at least trailing-edge-blanking time. A trailing-edge-avoidance region is sometimes referred to herein as a trailing-edge-avoidance window.

As shown in FIG. 6, trailing-edge-avoidance region 600 for string Y is defined relative to the detection window for string X. For example, the beginning of trailing-edge-avoidance region 600 for string Y may be defined by a time corresponding to $T_{phase\_shift} + T_{rising\_blanking} -$ Ttrailing_blanking, where Tphase_shift is the time between the rising edge for string Y and the rising edge 504 for string X, Trising_blanking is the length of the rising edge blanking period for string X, and Ttrailing_blanking is the length of the trailing-edge-blanking period for string Y. The end of trailing-edge-avoidance region 600 for string Y may be defined by a time corresponding to Tphase_shift+Trising_blanking+Tdw, where Tdw is the length of the headroom voltage detection window for string X.

Referring back to the example of FIG. 4 in which the strings (channels) of LEDs are separated into six phase shift groups, LED driver circuitry 310 and headroom control circuitry 308 may determine trailing-edge-avoidance regions for five ranges of duty cycles for each channel that may affect other channels. However, this example is merely illustrative and other numbers of groups of LED strings can be used. In another illustrative example, forty-eight phase shift groups are used resulting in forty-seven ranges of duty for each channel that may affect other channels.

To prevent the trailing edge 508 of second PWM signal 502 from falling within the trailing-edge-avoidance window 600, the trailing edge 508 and/or the rising edge of the PWM-on pulse for string Y may be adjusted or modified. In scenarios in which the trailing edge is adjusted without adjusting the rising edge, the trailing edge may be adjusted differently for each PWM cycle to preserve the average duty cycle for string Y.

FIG. 7 shows how trailing-edge-avoidance window 600 may be divided into segments such as clock cycle segments 700. In accordance with various aspects, clock cycle segments 700 may be used to determine the modifications to the trailing edge of the PWM-on cycle for string Y.

For example, in one operational scenario, Trising_blanking=Tfalling_blanking=2 clock cycles, Tdw=2 clock cycles, and falling-edge-avoidance region 600 is four clock cycles in length. In this example, if the trailing/falling edge 508 of the PWM-on cycle 503 for string Y is to occur at Tphase_shift+1 clock cycle, then the PWM duty cycle for string Y may be adjusted (e.g., by headroom control circuitry 308) by modifying the trailing edge 508 by −1 clock cycle, −1 clock cycle, −1 clock cycle and +3 clock cycles for every four PWM cycles. Each PWM period 400 may include multiple PWM cycles corresponding to a pair of PWM-on and PWM-off pulses.

As another example, if the falling edge of the PWM-on pulse 503 for string Y is scheduled to occur at Tphase_shift+2 clock cycles, then the PWM duty cycle for string Y may be adjusted (e.g., by headroom control circuitry 308) by modifying the trailing edge 508 by −2 clock cycles and +2 clock cycles for every two PWM cycles. As another example, if the falling edge of the PWM-on pulse 503 for string Y is to occur at Tphase_shift+3 clock cycles, then the PWM duty cycle for string Y may be adjusted (e.g., by headroom control circuitry 308) by modifying the trailing edge 508 by +1 clock cycle, +1 clock cycle, +1 clock cycle and −3 clock cycles for every two PWM cycles. In this way, the average duty cycle does not change even though the length of each PWM-on pulse changes, and the falling edge of each PWM-on pulse always occurs outside the falling-edge avoidance region of time.

In these examples, if the falling edge of the PWM-on pulse 503 for string Y is to occur at Tphase_shift+0 or less clock cycles or Tphase_shift+4 or more clock cycles, no adjustment to the falling edge is made. In some implementations, dithering of the phase shifts may be applied (e.g., using a dither table). In dithering implementations, the dithering may be combined with the falling edge adjustment (e.g., by multiplying the dither table entries by the amount of shift of the falling edge).

The example operations described above in connection with FIG. 7 help prevent falling edge 508 from occurring during the falling-edge-avoidance region by modifying the length of a PWM-on pulse by modifying the timing of the falling edge of the pulse. However, in some scenarios, LED driver circuit 310 and headroom control circuit 308 may help prevent falling edge 508 from occurring during the falling-edge-avoidance region by shifting the entire PWM-on pulse by modifying both the rising edge and the falling edge of the pulse.

Figure 8A:
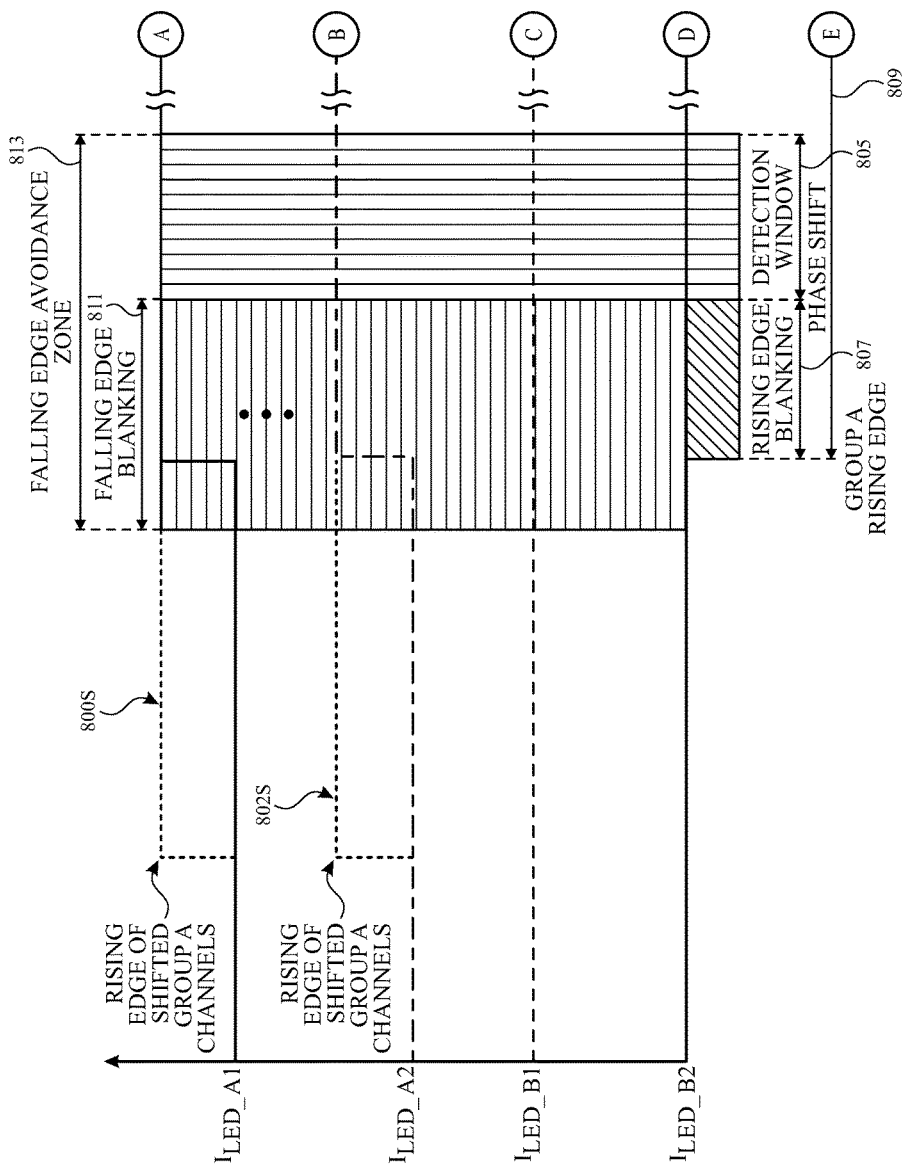
FIGS. 8A and 8B illustrate an exemplary timing diagram including rising edge modifications of a pulse-width-modulation cycle for operation of, and headroom detection for LEDs in accordance with various aspects of the subject technology.
Figure 8B:
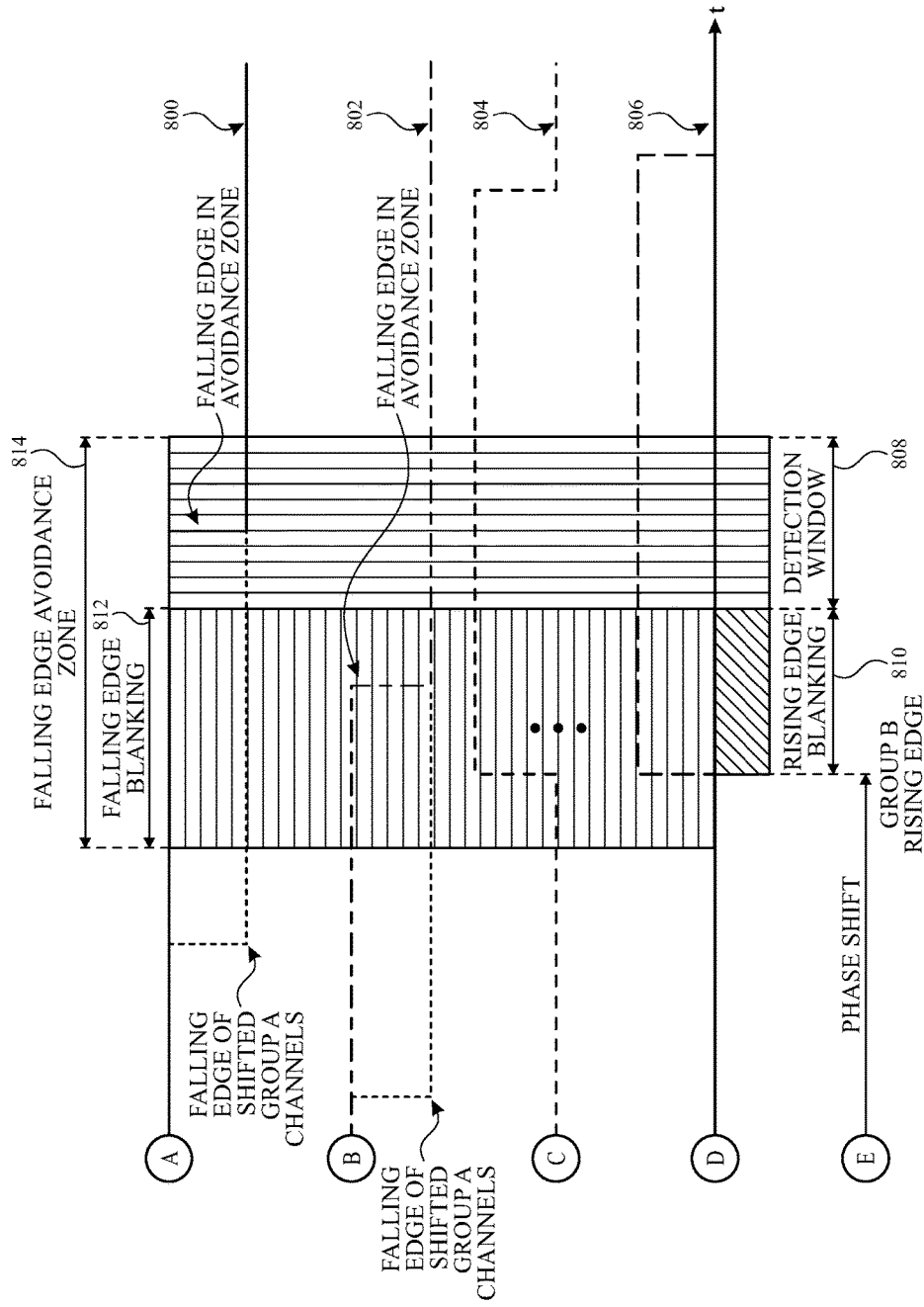

FIGS. 8A and 8B combine to show a timing diagram that includes PWM signals 800 and 802 for two LED strings A1 and A2 in a first group A (e.g., one of groups G1-G6 of FIG. 4) and PWM signals 804 and 806 for two LED strings B1 and B2 in a second group B (e.g., another one of groups G1-G6 of FIG. 4). A rising edge blanking period 807, a headroom detection window 805, a falling edge blanking period 811, and a falling-edge-avoidance window 813 for strings A1 and A2 are shown. As shown, rising edge blanking period 807, headroom voltage detection window 805, falling edge blanking period 811, and falling-edge-avoidance window 813 for all of the strings of group A may be the same. A rising edge blanking period 810, a headroom detection window 808, a falling edge blanking period 812, and a falling-edge-avoidance window 814 for strings B1 and B2 are also shown. As shown, rising edge blanking period 810, headroom detection window 808, falling edge blanking period 812, and falling-edge-avoidance window 814 for all of the strings of group B are the same.

In the example of FIGS. 8A and 8B, the falling edges of both PWM signals 800 and 802 for strings A1 and A2 are scheduled to occur in the falling-edge-avoidance region 814 for both of strings B1 and B2. However, in order to prevent the falling edges from occurring during falling-edge-avoidance region 814, shifted PWM signals 800S and 802S respectively for strings A1 and A2 are generated. Shifted PWM signals 800S and 802S are generated by shifting entire on-pulses as shown. The shifted on-pulses have shifted rising and falling edges relative to the on-pulses of unshifted signals 800 and 802 such that the PWM duty cycle of PWM signals 800 and 802 are unchanged, but the falling edges of the shifted group A channels do not occur during the falling-edge-avoidance region 814 for strings B1 and B2.

In accordance with various aspects, the PWM-on pulse (e.g., the shift of the rising and trailing edges of the PWM-on pulse) for one or more strings in a group of strings is moved to a shifted time that is earlier than the unshifted time of the phase shift of that group. In accordance with various aspects, the strings with the shifted PWM signals have headroom voltage detection windows (e.g., detection windows 808) that are common with the detection window of the other strings of that group, whether shifted or not. In accordance with various aspects, shifted PWM signals 800S and 802S are generated by shifting the PWM-on pulses of those signals earlier by an amount of time that depends, at least in part, on a length of the headroom detection window for one or more other strings and/or a length of a trailing-edge-blanking window for strings A1 and A2 (e.g., an amount of time that is equal to Tfalling_blanking+Tdw). In accordance with various aspects, the phase shift of a shifted group of strings remains greater than, for example, Tfalling_blanking+Trising_blanking+2* Tdw.

Figure 9:
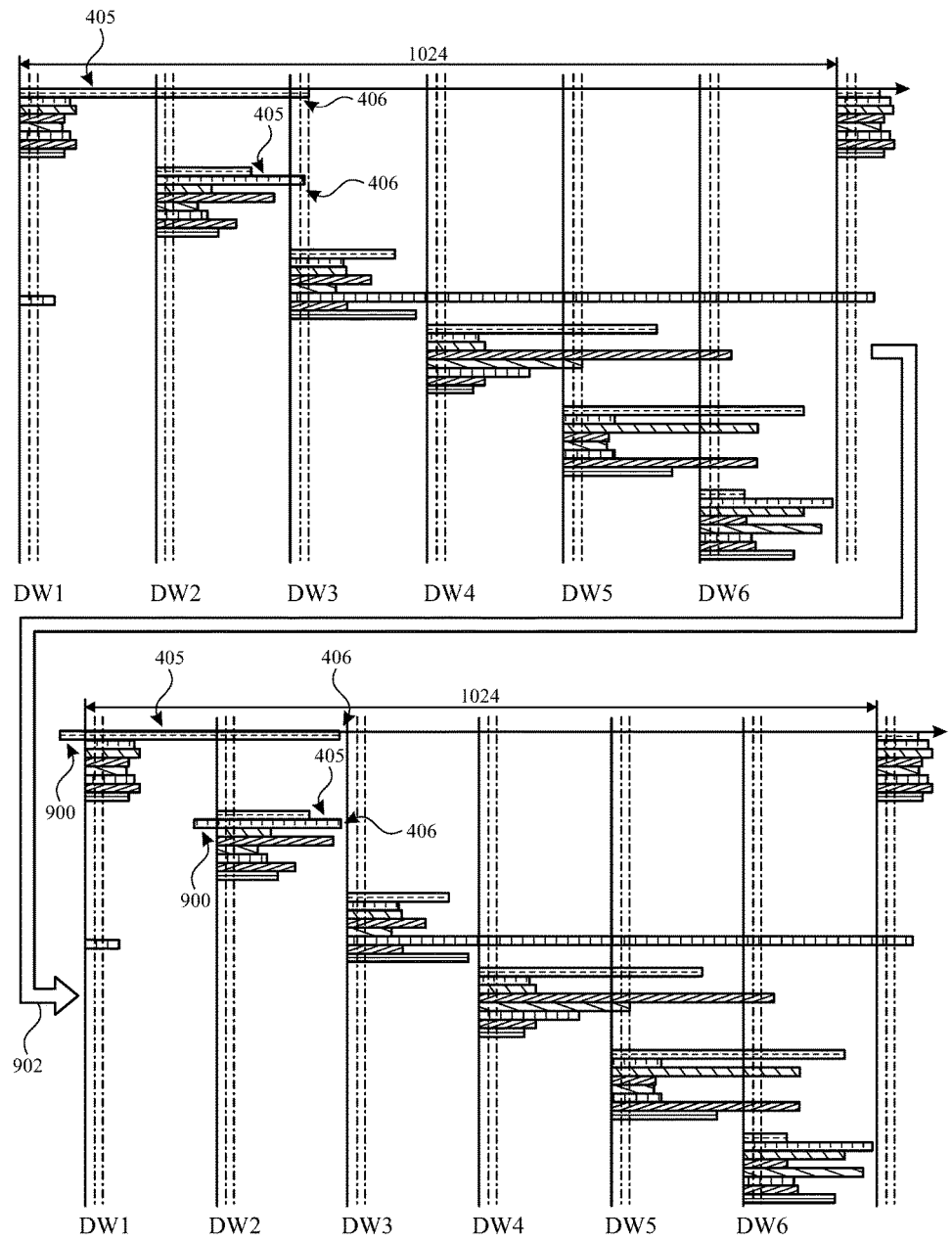
FIG. 9 illustrates a phase shift diagram that shows rising edge modifications for a system of multiple LEDs in accordance with various aspects of the subject technology

FIG. 9 shows exemplary phase shift diagrams before and after a modification to the rising edge of the PWM-on pulses having trailing edges in an avoidance region of another string. In the example of FIG. 9, two PWM duty cycles result in falling edges 406 within a detection window of another LED string. However, as indicated by arrow 902, the rising edges 900 of the PWM-on cycles for those PWM duty cycles can be shifted such that the duty cycle remains the same but the trailing edges 406 are shifted out of the other string's detection window.

Whether the modifications to the PWM cycles are modifications to the trailing edges as described in connection with FIG. 7 or to the rising edges (and the trailing edges) as described in connection with FIGS. 8 and 9, once the modifications are determined and applied, the modifications may remain the same until the PWM cycles are changed for illumination change purposes (e.g., when a different brightness for one or more strings of LEDs is desired).

Figure 10:
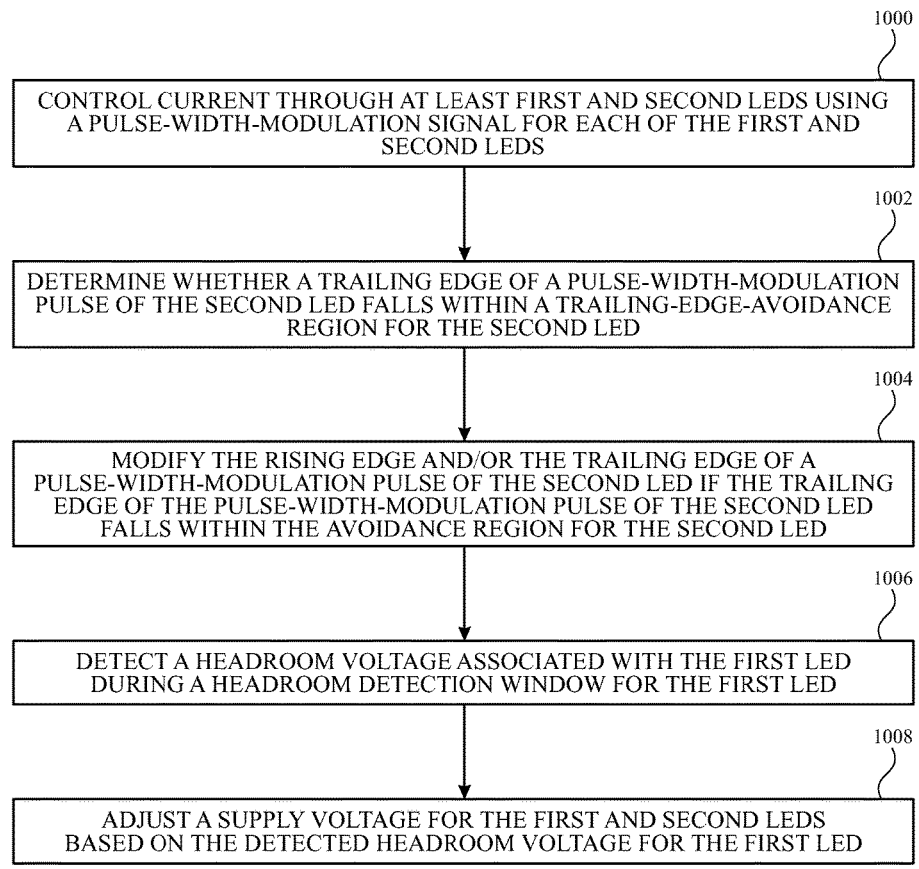
FIG. 10 illustrates a flow chart of illustrative operations that may be used for operating LED control circuitry including headroom voltage control circuitry in accordance with various aspects of the subject technology.

FIG. 10 depicts a flow diagram of an example process for headroom voltage control for light-emitting diodes in accordance with various aspects of the subject technology. For explanatory purposes, the example process of FIG. 10 is described herein with reference to the components of FIGS. 1-3. Further for explanatory purposes, the blocks of the example process of FIG. 10 are described herein as occurring in series, or linearly. However, multiple blocks of the example process of FIG. 10 may occur in parallel. In addition, the blocks of the example process of FIG. 10 need not be performed in the order shown and/or one or more of the blocks of the example process of FIG. 10 need not be performed.

In the depicted example flow diagram, at block 1000, a current through at least first and second LEDs (e.g., first and second strings of LEDs such as strings 302 of LEDs such as LEDs 304) may be controlled using a pulse-width-modulation signal for each of the first and second LEDs. The first and second LEDs may be coupled in parallel between a common supply voltage line and individual associated LED driver circuitry that controls the flow of current through that LED. For example, the first and second LEDs may be formed, respectively, in first and second strings 302 of LEDs 304.

The PWM signal for each of the LEDs may include a first PWM signal (e.g., PWM signal 500 of string X of FIG. 5 or one of PWM signals 804 or 806 of strings B1 or B2 of FIGS. 8A and 8B) having a first PWM duty cycle for the first LED and a second PWM signal (e.g., PWM signal 502 of string Y of FIG. 5 or one of PWM signals 800 or 802 of strings B1 or B2 of FIGS. 8A and 8B) having a second PWM duty cycle for the second LED. The first PWM duty cycle may be different than the second PWM duty cycle and may be phase shifted relative to the first PWM duty cycle such that a rising edge of the second PWM signal occurs before a rising edge of the first PWM signal. The first and second PWM signals may be provided by an LED driver circuit, sometimes referred to herein as a PWM driver, LED driver control circuit, or a driver (see, e.g., LED driver control circuit of FIG. 3).

At block 1002, the driver may determine whether a trailing edge of a pulse-width-modulation pulse of the second LED is to occur within a falling-edge-avoidance window for the second LED. The falling-edge-avoidance window of the second LED may be based on a headroom voltage detection window for the first LED, a trailing-edge-blanking window for the second LED, and/or a rising-edge-blanking window for the first LED, as described herein.

At block 1004, the driver may modify the rising edge or the trailing edge of the pulse-width-modulation pulse of the second LED if the trailing edge of the pulse-width-modulation pulse of the second LED is scheduled to occur within the falling-edge-avoidance window for the second LED. Modifying the trailing edge of the PWM-on pulse of the second LED may include shifting the time of the trailing edge by one or more clock cycles for each PWM cycle as described, for example, above in connection with FIG. 7. Modifying the rising edge may include shifting the entire PWM-on pulse as described, for example, above in connection with FIGS. 8 and 9.

It should also be appreciated that the first and second LEDs described in the example of FIG. 10 may be part of a larger system of LEDs and the rising or trailing edge of the first PWM signal for the first LED may also be modified based on a headroom detection window for a third LED and so on such that, for all LEDs in the system (e.g., all LEDs or strings of LEDs in a display backlight or other device), a headroom voltage detection window is available for each PWM pulse for each LED (or string of LEDs).

At block 1006, headroom voltage control circuitry may detect a headroom voltage associated with the first LED during the headroom detection window for the first LED.

At block 1008, the headroom voltage control circuitry may adjust a supply voltage for the first and second LEDs based on the detected headroom voltage for at least the first LED. For example, if the detected headroom voltage for the first LED, the second LED, or any other LED is less than a lower threshold voltage, the headroom voltage control circuitry may cause a DC/DC converter to increase the common supply voltage Vo for both the first and second LEDs (and other LEDs in the system, if applicable) to ensure sufficient headroom voltage for operation of the first and second LEDs (and the other LEDs in the system).

In accordance with various aspects of the subject disclosure, an electronic device with a display is provided, the display including first and second light-emitting diodes coupled in parallel to a common supply voltage source. The circuitry also includes driver circuitry configured to operate the first light-emitting diode using a first pulse-width-modulation signal and the second light-emitting diode using a second pulse-width-modulation signal. The circuitry also includes headroom control circuitry configured to sample a headroom voltage associated with the first light-emitting diode during a headroom detection window for the first light-emitting diode. The driver circuitry is configured to modify at least a trailing edge of the second pulse-width-modulation signal if the trailing edge of the second pulse-width-modulation signal is to occur within a trailing-edge-avoidance window for the second light-emitting diode that extends from before a rising edge of the first pulse-width-modulation signal at least to an end of the headroom detection window for the first light-emitting diode.

In accordance with other aspects of the subject disclosure, a method of operating a display of an electronic device is provided that includes controlling first and second currents through first and second light-emitting diodes coupled in parallel to a common supply voltage using a first pulse-width-modulation signal for the first light-emitting diode and a second pulse-width-modulation signal for the second light-emitting diode. The method also includes determining whether a trailing edge of the second pulse-width-modulation signal is scheduled to occur during a trailing-edge-avoidance window for the second light-emitting diode, the trailing-edge-avoidance window extending from before a rising edge of the first pulse-width-modulation signal at least to an end of a headroom voltage detection window for the first light-emitting diode. The method also includes modifying at least the trailing edge of the second pulse-widthmodulation signal if the trailing edge of the second pulse-width-modulation signal is scheduled to occur during the trailing-edge-avoidance window.

In accordance with various aspects of the subject disclosure, an electronic device with a display is provided, the display including first and second strings of light-emitting diodes coupled in parallel to a common supply voltage source, each of the first and second strings comprising a plurality of light-emitting diodes in series. The circuitry also includes driver circuitry configured to operate the first string using a first pulse-width-modulation signal and the second string using a second pulse-width-modulation signal. The circuitry also includes headroom control circuitry configured to sample a headroom voltage associated with the first string during a headroom voltage detection window for the first string. The driver circuitry is configured to modify at least a trailing edge of the second pulse-width-modulation signal if the trailing edge of the second pulse-width-modulation signal is to occur within a trailing-edge-avoidance window of the second string, the trailing-edge-avoidance window for the second string extending from before a rising edge of the first pulse-width-modulation signal at least to an end of the headroom voltage detection window for the first string.

Various functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "processor", and "memory" all refer to electronic or other technological devices. These terms exclude people or groups of people. For the purposes of the specification, the terms "display" or "displaying" means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device as described herein for displaying information to the user and a keyboard and a pointing device, such as a mouse or a trackball, by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Some of the blocks may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "example" is used herein to mean "serving as an example or illustration." Any aspect or design described herein as "example" is not necessarily to be construed as preferred or advantageous over other aspects or design All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. An electronic device with a display, the display comprising
   first and second light-emitting diodes coupled in parallel to a common supply voltage source;
   driver circuitry configured to operate the first light-emitting diode using a first pulse-width-modulation signal and the second light-emitting diode using a second pulse-width-modulation signal; and
   headroom control circuitry configured to sample a headroom voltage associated with the first light-emitting diode during a headroom detection window for the first light-emitting diode,
   wherein the driver circuitry is configured to modify at least a trailing edge of the second pulse-width-modulation signal if the trailing edge of the second pulse-width-modulation signal is to occur within a trailing-edge-avoidance window for the second light-emitting diode that starts from before a rising, edge of the first pulse-width-modulation signal and extends beyond an end of the headroom detection window associated with the first light-emitting diode.

2. The electronic device of claim 1, wherein the headroom detection window for the first light-emitting diode occurs within an on pulse of the first pulse-width-modulation signal and extends from a rising-edge blanking time after a rising edge of the on pulse to a time before a falling edge of the on pulse.

3. The electronic device of claim 1, wherein the driver circuitry is configured to modify at least the trailing edge of the second pulse-width-modulation signal by adding at least one clock cycle to a duty cycle of the second pulse-width-modulation signal for at least one pulse-width-modulation cycle of the second pulse-width-modulation signal.

4. The electronic device of claim 3, wherein the driver circuitry is further configured to modify at least the falling edge of the second pulse-width-modulation signal by subtracting at least one clock cycle from the duty cycle of the second pulse-width-modulation signal for at least another pulse-width-modulation cycle of the second pulse-width-modulation signal.

5. The electronic device of claim 4, wherein the driver circuitry is configured to add the at least one clock cycle for the at least one pulse-width-modulation cycle and subtract the at least one clock cycle for the at least another pulse-width-modulation cycle to generate a shifted second pulse-width-modulation signal with an average duty cycle over the at least one pulse-width-modulation cycle and the at least another pulse-width-modulation cycle is the same as the duty cycle of the second pulse-width-modulation signal.

6. The electronic device of claim 1, wherein the driver circuitry is configured to modify at least the falling edge of the second pulse-width-modulation signal by shifting an entire on-pulse of the second pulse-width-modulation signal to a shifted time that is earlier than an unshifted time for the on-pulse.

7. The electronic device of claim 6, wherein the driver circuitry is configured to shift the entire on-pulse by a time that depends, at least in part, on a length of the headroom detection window for the first light-emitting diode.

8. The electronic device of claim 7, wherein the driver circuitry is further configured to shift the entire on-pulse by a time that further depends, at least in part, on a length of a trailing-edge-blanking window for the second light-emitting diode.

9. The electronic device of claim 1, wherein the headroom control circuitry is configured to cause a modification to a common supply voltage of the common supply voltage source based on the sampled headroom voltage for the first light-emitting diode.

10. The electronic device of claim 1, wherein the headroom control circuitry is further configured to sample a headroom voltage of the second light-emitting diode during a headroom detection window for the second light-emitting diode.

11. A method of operating a display of an electronic device, comprising:
controlling first and second currents through first and second light-emitting diodes coupled in parallel to a common supply voltage using a first pulse-width-modulation signal for the first light-emitting diode and a second pulse-width-modulation signal for the second light-emitting diode;
determining whether a trailing edge of the second pulse-width-modulation signal is scheduled to occur during a trailing-edge-avoidance window for the second light-emitting diode, the trailing-edge-avoidance window starting from before a rising edge of the first pulse-width-modulation signal and extending beyond an end of a headroom voltage detection window associated with the first light-emitting diode; and
modifying at least the trailing edge of the second pulse-width-modulation signal if the trailing edge of the second pulse-width-modulation signal is scheduled to occur during the trailing-edge-avoidance window.

12. The method of claim 11, further comprising sampling a headroom voltage for the first light-emitting diode during the headroom voltage detection window for the first light-emitting diode.

13. The method of claim 12, further comprising modifying the common supply voltage based on the sampled headroom voltage for the first light-emitting diode.

14. The method of claim 13, wherein sampling the headroom voltage comprises sampling a residual voltage on a first side of the first light-emitting diode that is opposite to a second side of the first light-emitting diode at which the common supply voltage is coupled to the first light-emitting diode.

15. The method of claim 12, further comprising sampling a headroom voltage for the second light-emitting diode during a headroom voltage detection window for the second light-emitting diode.

16. The method of claim 15, further comprising modifying at least a trailing edge of a third pulse-width-modulation signal for a third light-emitting diode to ensure that the trailing edge of the third pulse-width-modulation signal does not occur during a trailing-edge-avoidance window for the third light-emitting diode, the trailing-edge-avoidance window for the third light-emitting diode based at least in part on the headroom voltage detection window for the second light-emitting diode.

17. The method of claim 11, wherein controlling the first and second currents through the first and second light-emitting diodes comprises applying a first phase shift to the first pulse-width-modulation signal for the first light-emitting diode relative to a second phase shift for the second pulse-width-modulation signal for the second light-emitting diode.

18. The method of claim 17, further comprising operating a first group of additional light-emitting diodes with the first phase shift and operating a second group of additional light-emitting diodes with the second phase shift.

19. The method of claim 11, wherein modifying at least the trailing edge comprises adding at least one clock cycle to a duty cycle of the second pulse-width-modulation signal for at least one pulse-width-modulation cycle of the second pulse-width-modulation signal and subtracting at least one clock cycle from the duty cycle of the second pulse-width-modulation signal for at least another pulse-width-modulation cycle of the second pulse-width-modulation signal.

20. The method of claim 11, wherein modifying at least the trailing edge comprises shifting an entire on-pulse of the second pulse-width-modulation signal to modify both the trailing edge and a rising edge of the on-pulse.

21. An electronic device with a display, the display comprising
first and second strings of light-emitting diodes coupled in parallel to a common supply voltage source, each of the first and second strings comprising a plurality of light-emitting diodes in series;
driver circuitry configured to operate the first string using a first pulse-width-modulation signal and the second string using a second pulse-width-modulation signal; and
headroom control circuitry configured to sample a headroom voltage associated with the first string during a headroom voltage detection window for the first string,
wherein the driver circuitry is configured to modify at least a trailing edge of the second pulse-width-modulation signal if the trailing edge of the second pulse-width-modulation signal is to occur within a trailing-edge-avoidance window of the second string, the trailing-edge-avoidance window for the second string starting from before a rising edge of the first pulse-width-modulation signal and extending beyond an end of the headroom voltage detection window associated with the first string.

* * * * *